United States Patent
Kim et al.

(10) Patent No.: US 11,302,909 B2
(45) Date of Patent: Apr. 12, 2022

(54) PREPARATION METHOD FOR ULTRATHIN SB2S3 NANOSHEET AS ANODE MATERIAL FOR LI/NA ION BATTERY APPLICATIONS

(71) Applicant: THE HONG KONG UNIVERSITY OF SCIENCE AND TECHNOLOGY, Hong Kong (CN)

(72) Inventors: Jang Kyo Kim, Hong Kong (CN); Shanshan Yao, Hong Kong (CN); Jiang Cui, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 394 days.

(21) Appl. No.: 16/522,898

(22) Filed: Jul. 26, 2019

(65) Prior Publication Data

US 2020/0035997 A1    Jan. 30, 2020

Related U.S. Application Data

(60) Provisional application No. 62/764,294, filed on Jul. 27, 2018.

(51) Int. Cl.
*H01M 4/1397* (2010.01)
*H01M 10/0525* (2010.01)
(Continued)

(52) U.S. Cl.
CPC ....... *H01M 4/1397* (2013.01); *H01M 4/0404* (2013.01); *H01M 4/044* (2013.01); *H01M 4/0471* (2013.01); *H01M 4/136* (2013.01); *H01M 4/581* (2013.01); *H01M 4/5815* (2013.01); *H01M 4/625* (2013.01);
(Continued)

(58) Field of Classification Search
CPC ............ H01M 4/1397; H01M 4/0404; H01M 4/0471; H01M 4/044; H01M 4/136; H01M 4/581; H01M 4/5815; H01M 4/625; H01M 4/58; H01M 10/0525; H01M 10/054; H01M 2004/027
See application file for complete search history.

(56) References Cited

FOREIGN PATENT DOCUMENTS

| CN | 102324503 A | 1/2012 |
| CN | 103227327 A | 7/2013 |

(Continued)

OTHER PUBLICATIONS

Ren et al., "Large-scale production of ultrathin topological insulator bismuth telluride nanosheets by a hydrothermal intercalation and exfoliation route," 2012, J. Mater. Chem., 22, 4921-4926. (Year: 2012).*

(Continued)

*Primary Examiner* — Matthew W Van Oudenaren
(74) *Attorney, Agent, or Firm* — Saliwanchik, Lloyd & Eisenschenk

(57) ABSTRACT

Methods of synthesizing few-layer two-dimensional (2D) $Sb_2S_3$ nanosheets using scalable chemical exfoliation are provided. The 2D $Sb_2S_3$ nanosheets can be developed as bi-functional anode materials in both lithium ion batteries (Continued)

and sodium ion batteries. The unique structural and functional features brought by 2D $Sb_2S_3$ nanosheets can offer short electron/ion diffusion paths and abundant active sites for surface redox reactions.

20 Claims, 17 Drawing Sheets

(51) Int. Cl.
  *H01M 10/054* (2010.01)
  *H01M 4/04* (2006.01)
  *H01M 4/136* (2010.01)
  *H01M 4/58* (2010.01)
  *H01M 4/62* (2006.01)
  *H01M 4/02* (2006.01)

(52) U.S. Cl.
  CPC ..... *H01M 10/054* (2013.01); *H01M 10/0525* (2013.01); *H01M 2004/027* (2013.01)

(56) References Cited

FOREIGN PATENT DOCUMENTS

| CN | 104600293 A | 5/2015 |
|---|---|---|
| CN | 106229472 A | 12/2016 |
| CN | 106410152 A | 2/2017 |
| CN | 105720251 B | 5/2018 |
| JP | 5446699 B2 | 3/2014 |

OTHER PUBLICATIONS

Song et al., "Highly Anisotropic Ab2Se3 Nanosheets: Gentle Exfoliation from the Bulk Precursors Posessing 1D Crystal Structure," 2017, Adv. Mater., 29, 1-7. (Year: 2017).*

Yao, S. et al., "Novel 2D $Sb_2S_3$ Nanosheet/CNT Coupling Layer for Exceptional Polysulfide Recycling Performance," *Advanced Energy Materials*, 2018, pp. 1-10, WILEY-VCH Verlag GmbH & Co. KGaA.

Yao, S. et al., "Unveiling the Unique Phase Transformation Behavior and Sodiation Kinetics of 1D van der Waals $Sb_2S_3$ Anodes for Sodium Ion Batteries," Advanced Energy Materials, 2017, pp. 1-11, WILEY-VCH Verlag GmbH & Co. KGaA.

Chang, K. et al., "In situ synthesis of $MoS_2$/graphene nanosheet composites with extraordinarily high electrochemical performance for lithium ion batteries†," Chem. Commun., 2011, 47:4252-4254, The Royal Society of Chemistry.

Kim, T. et al., "Novel $SnS_2$-nanosheet anodes for lithium-ion batteries," Journal of Power Sources, 2007, 167:529-535, Elsevier B.V.

Hou, H. et al., "One-Dimensional Rod-Like $Sb_2S_3$-Based Anode for High-Performance Sodium-Ion Batteries," ACS Applied Materials & Interfaces, 2015, 7:19362-19369, American Chemical Society.

* cited by examiner

PREPARATION METHOD FOR ULTRATHIN SB2S3 NANOSHEET AS ANODE MATERIAL FOR LI/NA ION BATTERY APPLICATIONS

CROSS-REFERENCE TO RELATED APPLICATION

This application claims the benefit of U.S. Provisional Patent Application No. 62/764,294, filed Jul. 27, 2018, which is hereby incorporated by reference in its entirety including any tables, figures, or drawings.

BACKGROUND

The increasing demand for use in emerging electrical vehicles (EVs), portable electronics, and unmanned aerial vehicles has prompted recent widespread research in developing energy storage systems (ESSs) with long cyclic stabilities, high energy/power densities, and cost-effective and sustainable characteristics. Among many energy storage devices, lithium ion batteries (LIBs) in particular dominate the rechargeable battery markets due to their high energy densities, long cyclic life, and relatively low self-discharge rates. However, future use of LIBs could be severely hindered by limited Li resources and sharp increases in the price of precursor materials. With electrochemistry similar to Li, Na is the sixth most abundant chemical element in Earth's crust and uniformly distributed around the world, making low cost sodium ion batteries (SIBs) an attractive alternative to LIBs in large-scale ESSs, including renewable energy integration and electrical grids. In order to accelerate the applications of both LIBs and SIBs, it is vital to develop bi-functional electrode materials with rationally designed structures and good electrochemical properties.

BRIEF SUMMARY

Embodiments of the subject invention provide methods of synthesizing few-layer two-dimensional $Sb_2S_3$ (2D-SS) nanosheets using scalable chemical exfoliation. Embodiments of the subject invention also provide 2D-SS nanosheets and applications of 2D-SS nanosheets as anode materials in both rechargeable lithium ion batteries (LIBs) and sodium ion batteries (SIBs). The 2D $Sb_2S_3$ nanosheets can be developed as bi-functional anode materials in both LIB and SIB applications. The unique structural and functional features brought by 2D-SS nanosheets can offer short electron/ion diffusion paths and abundant active sites for surface redox reactions.

The 2D-SS nanosheets of embodiments of the subject invention exhibit a well-defined layered structure with good crystallinity, ultrathin thickness, and large aspect ratio. The average thickness of 2D-SS nanosheets can be, for example 3.8 nanometers (nm), which is beneficial for fast ion/electron diffusion in the electrode and improves the rate capabilities when tested in batteries. In addition, the 2D-SS nanosheets possess a large specific surface area and pore volume. The large surface area offers abundant active sites between the $Sb_2S_3$ active material and electrolyte, giving rise to enhanced ionic conductivities and improved surface redox reactions.

The 2D-SS nanosheets can be prepared by a facile and scalable chemical Li intercalation-assisted exfoliation method, which involves mainly solvothermal treatment, sonication, and centrifugation. $Sb_2S_3$ powder (e.g., commercial $Sb_2S_3$ powder) can be used as the precursor for exfoliation, and $Li_2CO_3$ salt can be used as the intercalating agent. The solvothermal process can be carried out in a benzyl alcohol solvent, which can be heated (e.g., at 220 degrees for 48 hours). The excess $Li_2CO_3$ salt can be eliminated (e.g., by using an acid such as 1 wt % HCl), and the final 2D-SS nanosheet powder can be obtained after freeze drying.

In an embodiment, a method for synthesizing 2D nanosheets can comprise: providing a bulk precursor; performing solvothermal intercalation of lithium (Li) atoms into van der Waals bonded interlayers of particles of the bulk precursor in the presence of a solvent to form Li-intercalated bulk compounds; performing a sonication process on the Li-intercalated bulk compounds to exfoliate the Li-intercalated bulk compounds into 2D nanosheets; performing a centrifugation process to separate the exfoliated 2D nanosheets and then washing the exfoliated 2D nanosheets; freeze drying the separated and washed 2D nanosheets; and collecting the 2D nanosheets after freeze drying. The bulk precursor can be a $Sb_2S_3$ bulk precursor, a $Sb_2Se_3$ bulk precursor, a $Bi_2S_3$ bulk precursor, or a $Sb_2Te_3$ bulk precursor, resulting $Sb_2S_3$ 2D nanosheets, $Sb_2Se_3$ 2D nanosheets, $Bi_2S_3$ 2D nanosheets, or $Sb_2Te_3$ 2D nanosheets, respectively.

In another embodiment, a method for synthesizing an anode comprising 2D nanosheets can comprise: providing a bulk precursor; performing solvothermal intercalation of lithium (Li) atoms into van der Waals bonded interlayers of particles of the bulk precursor in the presence of a solvent to form Li-intercalated bulk compounds; performing a sonication process on the Li-intercalated bulk compounds to exfoliate the Li-intercalated bulk compounds into 2D nanosheets; performing a centrifugation process to separate the exfoliated 2D nanosheets and then washing the exfoliated 2D nanosheets; freeze drying the separated and washed 2D nanosheets; collecting the 2D nanosheets after freeze drying; and depositing the collected 2D nanosheets on a conductive substrate and heating to form the anode. The bulk precursor can be a $Sb_2S_3$ bulk precursor, a $Sb_2Se_3$ bulk precursor, a $Bi_2S_3$ bulk precursor, or a $Sb_2Te_3$ bulk precursor, resulting $Sb_2S_3$ 2D nanosheets, $Sb_2Se_3$ 2D nanosheets, $Bi_2S_3$ 2D nanosheets, or $Sb_2Te_3$ 2D nanosheets, respectively. The method can further comprise: mixing the collected 2D nanosheets with a conductive agent (e.g., graphene, carbon nanofibers (CNFs), and/or carbon nanotubes (CNTs)) and a binder in a solvent to form a slurry, prior to depositing the collected 2D nanosheets on the conductive substrate; and depositing the slurry comprising the collected 2D nanosheets on the conductive substrate and heating to form the anode.

In another embodiment, a method for synthesizing a battery comprising an anode comprising 2D nanosheets can comprise: providing a bulk precursor; performing solvothermal intercalation of lithium (Li) atoms into van der Waals bonded interlayers of particles of the bulk precursor in the presence of a solvent to form Li-intercalated bulk compounds; performing a sonication process on the Li-intercalated bulk compounds to exfoliate the Li-intercalated bulk compounds into 2D nanosheets; performing a centrifugation process to separate the exfoliated 2D nanosheets and then washing the exfoliated 2D nanosheets; freeze drying the separated and washed 2D nanosheets; collecting the 2D nanosheets after freeze drying; depositing the collected 2D nanosheets on a conductive substrate and heating to form the anode; and combining the anode with a cathode to form the battery. The battery can be an LIB or an SIB, and the bulk precursor can be a $Sb_2S_3$ bulk precursor, a $Sb_2Se_3$ bulk precursor, a $Bi_2S_3$ bulk precursor, or a $Sb_2Te_3$ bulk precursor, resulting $Sb_2S_3$ 2D nanosheets, $Sb_2Se_3$ 2D nanosheets, Bi$_2$S$_3$ 2D nanosheets, or Sb$_2$Te$_3$ 2D nanosheets, respectively. The method can further comprise: mixing the collected 2D nanosheets with a conductive agent (e.g., graphene, CNFs, and/or CNTs) and a binder in a solvent to form a slurry, prior to depositing the collected 2D nanosheets on the conductive substrate; and depositing the slurry comprising the collected 2D nanosheets on the conductive substrate and heating to form the anode.

BRIEF DESCRIPTION OF THE DRAWINGS

FIG. 2a is a photograph of Sb$_2$S$_3$ suspension before sonication; FIG. 2b is a photograph of Sb$_2$S$_3$ suspension after sonication; FIG. 2c is a photograph of Sb$_2$S$_3$ suspension after centrifugation; and FIG. 2d is a photograph of exfoliated 2D Sb$_2$S$_3$ nanosheet dispersion showing the Faraday-Tyndall effect.

FIG. 3a is a scanning electron microscope (SEM) image of commercial bulk Sb$_2$S$_3$ powders before exfoliation; FIG. 3b is an SEM image of 2D Sb$_2$S$_3$ nanosheets; FIG. 3c is an optical microscopy (OM) image of 2D Sb$_2$S$_3$ nanosheets on SiO$_2$; and FIG. 3d is a transmission electron microscope (TEM) image (selected area electron diffraction (SAED) patterns in inset) of 2D Sb$_2$S$_3$ nanosheets.

FIG. 4a is an atomic force microscopy (AFM) image of 2D Sb$_2$S$_3$ nanosheets with height profiles corresponding to the lines; FIG. 4b is an AFM image with a corresponding height profile for a 1.5 nm thick monolayer 2D Sb$_2$S$_3$; and FIG. 4c is the thickness distribution measured by AFM on 110 nanosheets.

FIG. 5a shows the pore size distributions, and FIG. 5b shows nitrogen adsorption/desorption isotherms of bulk Sb$_2$S$_3$ (B-SS), Li intercalated bulk Sb$_2$S$_3$ (Li-B-SS), and 2D Sb$_2$S$_3$ nanosheets (2D-SS).

FIG. 6a shows the cyclic voltammetry (CV) curves of 2D-SS electrode at a scan rate of 0.1 mV·s$^{-1}$ (millivolts per second) between 0 and 3.0 V. FIG. 6b shows the cyclic performance of the 2D-SS and B-SS electrodes tested in LIBs measured at a current density of 0.2 A·g$^{-1}$ (amps per gram) for 200 cycles; the bottom-most line is for B-SS and the line above that is for 2D-SS. FIG. 6c shows the rate capabilities of 2D-SS and B-SS electrodes measured at current densities ranging from 0.05 to 2.0 A·g$^{-1}$. FIG. 6d provides the Nyquist plots and an equivalent circuit (inset of FIG. 6d) of LIBs using 2D-SS and B-SS electrodes. FIG. 6e shows the cyclic performance of 2D-SS electrode tested in LIBs measured at a current density of 0.5 A·g$^{-1}$ for 500 cycles.

FIG. 7a shows the CV curves of 2D-SS electrode at a scan rate of 0.1 mV·s$^{-1}$ between 0 and 3.0 V. FIG. 7b shows the cyclic performance of 2D-SS and B-SS electrodes tested in SIBs measured at a current density of 0.2 A·g$^{-1}$ for 100 cycles; the bottom-most line is for B-SS and the line above that is for 2D-SS. FIG. 7c is the rate capabilities of 2D-SS and B-SS electrodes measured at current densities ranging from 0.05 to 2.0 A·g$^{-1}$. FIG. 7d provides the Nyquist plots and an equivalent circuit (inset of FIG. 7d) of SIBs using 2D-SS and B-SS electrodes.

DETAILED DESCRIPTION

Figure 1:
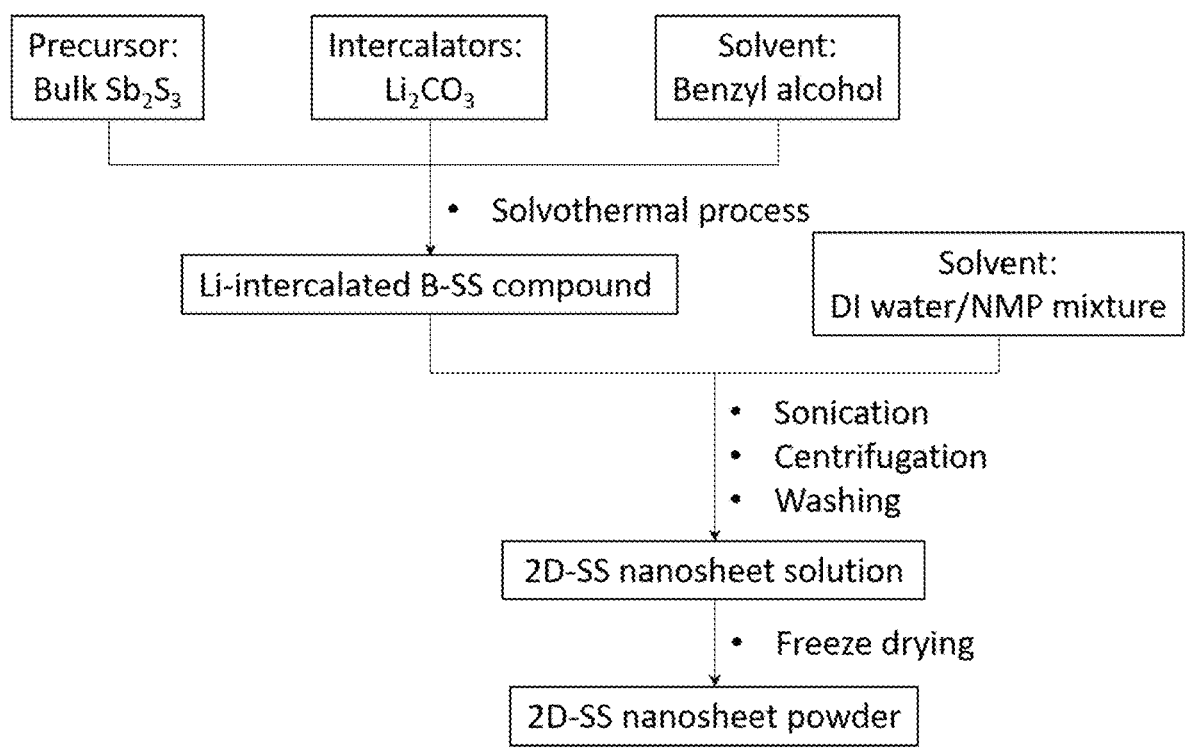
FIG. 1 is a flow diagram showing a synthesis process of 2D-SS nanosheets according to an embodiment of the subject invention.

Embodiments of the subject invention provide methods of synthesizing few-layer two-dimensional Sb$_2$S$_3$ (2D-SS) nanosheets using scalable chemical exfoliation. Embodiments of the subject invention also provide 2D-SS nanosheets and applications of 2D-SS nanosheets as anode materials in both rechargeable lithium ion batteries (LIBs) and sodium ion batteries (SIBs). The 2D Sb$_2$S$_3$ nanosheets can be developed as bi-functional anode materials in both LIB and SIB applications. The unique structural and functional features brought by 2D-SS nanosheets can offer short electron/ion diffusion paths and abundant active sites for surface redox reactions.

Among various anode materials, antimony sulfide (Sb$_2$S$_3$) has received much attention owing to its high specific theoretical capacity (946 mAh·g$^{-1}$) and promising electrochemical activities as a bi-functional anode in both LIBs and SIBs. However, its semiconducting nature with an electrical conductivity ranging $10^{-8}$-$10^{-9}$ S·cm$^{-1}$, and the structural pulverization of Sb$_2$S$_3$ electrodes resulting from the volume change during charge/discharge cycles, may lead to rapid capacity fading and poor rate capabilities. To alleviate the above issues, many Sb$_2$S$_3$-based nanomaterials have been synthesized and tested as anodes in LIBs or SIBs, such as micro-flowers, nanorods, and nanoparticles. Since the successful exfoliation of graphene in 2004, two-dimensional (2D) nanosheet materials have been studied for a wide range of applications due to their unique physical and chemical properties, including optical, electronic, and energy storage capabilities. Many 2D nanomaterials, such as graphene, phosphorene, MXene, MoS$_2$, and SnS$_2$, have been successfully exfoliated and studied for LIBs or SIBs, demonstrating enhanced electrochemical performance compared to their bulk counterparts. Sb$_2$S$_3$ is a highly anisotropic, layer-structured semiconductor stacked by the weak van der Waals forces between the numerous 1D (Sb$_4$S$_6$), moieties. Because of the intrinsically preferential growth of 1D nanorods along the c-axis, though, it is difficult to exfoliate bulk Sb$_2$S$_3$ (SS) powders into few layer nanosheets either by a bottom-up or top-down approach. Therefore, embodiments of the subject invention provide methods for synthesizing advanced 2D-SS nanosheets using bulk Sb$_2$S$_3$ (B-SS) powder precursor based on a chemical exfoliation method. The distinctive 2D-SS nanosheets with ultrathin thickness, large aspect ratio and abundant active sites can be used as bi-functional anodes with high capacities and good rate capabilities in both LIBs and SIBs.

In many embodiments, the synthesis of 2D-SS nanosheets uses a facile and scalable chemical Li intercalation-assisted exfoliation method. The obtained 2D-SS nanosheets can have an ultrathin thickness (e.g., less than 5 nm, such as 3.8 nm) and can present a well-defined layered structure and lateral sizes up to several tens of micrometers (e.g., up to 20, 30, 40, 50, 60, 70, 80, 90, or 100 micrometers (μm); for example, up to 20 or 30 μm). In addition, 2D-SS nanosheets with a large specific area (e.g., of greater than 120 square meters per gram, such as about 124 m$^2$·g$^{-1}$) and a pore volume of around, e.g., 0.33 cm$^3$·g$^{-1}$ can give rise to an extremely large aspect ratio. Both the thickness and lateral size of 2D-SS nanosheets can be selectively controlled by adjusting the speeds and time of the centrifugation process.

When used in LIBs, the 2D-SS electrode delivers a high capacity (e.g., of at least 800 mAh-g$^{-1}$ (such as 900 mAh-g$^{-1}$) at a current density of 0.2 A-g$^{-1}$). Even at high current density of 2.0 A-g$^{-1}$, the 2D-SS electrodes can present a solid reversible capacity (e.g., of 607 mAh g$^{-1}$). When used in SIBs, the 2D-SS electrode can exhibit a robust reversible capacity (e.g., of about 680 mAh g$^{-1}$ at a current density of 0.05 A g$^{-1}$). These properties are mentioned for exemplary purposes only and should not be construed as limiting. Coin cells, such as CR2032 coin cells, can be used to test the electrochemical performance of 2D-SS electrodes in both LIBs and SIBs.

In an embodiment, a method for synthesizing 2D-SS nanosheets with ultrathin thickness can comprise: (i) solvothermal intercalation of Li atoms into the van der Waals bonded interlayers of bulk $Sb_2S_3$ (B-SS) particles in the presence of a solvent (e.g., benzyl alcohol); (ii) exfoliation of Li-intercalated B-SS (Li-B-SS) compounds into 2D-SS nanosheets through a sonication process (e.g., a mild bath sonication process); (iii) separation and washing of the exfoliated $Sb_2S_3$ dispersion using centrifugation; and (iv) collection of 2D-SS nanosheet powder after freeze drying. The anodes prepared from the 2D-SS nanosheets exhibit exceptional cyclic capacities and rate capabilities in both LIBs and SIBs.

The anodes made from 2D-SS nanosheets of embodiments of the subject invention exhibit greatly improved characteristics over related art electrodes in terms of capacities, electrochemical cyclic stability, and high rate capabilities.

FIG. 1 is a flow diagram showing a synthesis process of 2D-SS nanosheets according to an embodiment of the subject invention. Referring to FIG. 1, using $Li_2CO_3$ salt as the intercalating agent, lithium atoms can be intercalated into the van der Waals bonded interlayers of (commercially available) bulk $Sb_2S_3$ precursors in the presence of a solvent (e.g., benzyl alcohol) (step 1). The generated Li-intercalated B-SS (Li-B-SS) compounds after the solvothermal process can be mildly sonicated (e.g., in a mixture such as a deionized water/N-methyl-2-pyrrolidone (DI water/NMP) mixture) to produce 2D-SS nanosheets after rapid solvation of Li and generation of hydrogen gas (step 2). The $Sb_2S_3$ dispersion after sonication can be separated and washed (e.g., using diluted HCl and DI water) at least one time and up to several times after centrifugation (step 3). Then, the synthesized 2D-SS nanosheet powder can be collected after freeze drying (step 4).

Figure 2A:
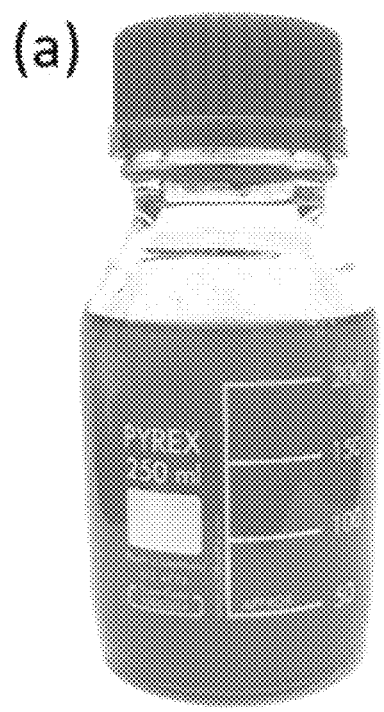
FIGS. 2a-2d are photographs of Sb$_2$S$_3$ suspension using a synthesis method according to an embodiment of the subject invention.
Figure 2B:
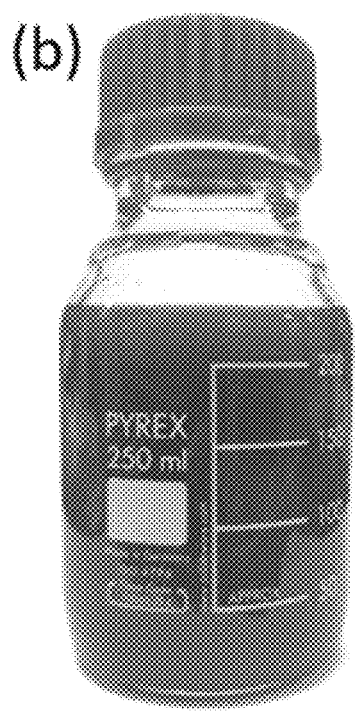
Figure 2C:
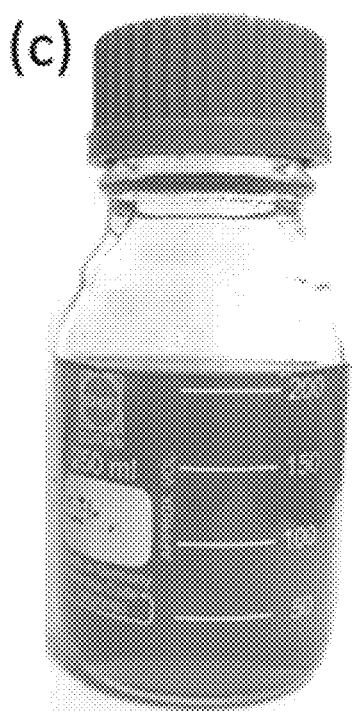
Figure 2D:

FIGS. 2a-2c show the color change of the $Sb_2S_3$ solution before sonication, after sonication, and after centrifugation, respectively, implying successful exfoliation of layered $Sb_2S_3$ nanosheets. FIG. 2a presents the light grey $Sb_2S_3$ suspension before sonication, which contains Li-B-SS compounds. FIG. 2b presents the dark brown $Sb_2S_3$ suspension, showing the exfoliation of Li-B-SS compounds after sonication. FIG. 2c exhibits the light brown $Sb_2S_3$ dispersion with abundant single- or few-layer $Sb_2S_3$ nanosheets. FIG. 2d is a photograph of exfoliated 2D $Sb_2S_3$ nanosheet dispersion showing the typical Faraday-Tyndall effect, verifying uniform dispersion of 2D $Sb_2S_3$ nanosheets.

Figure 3A:
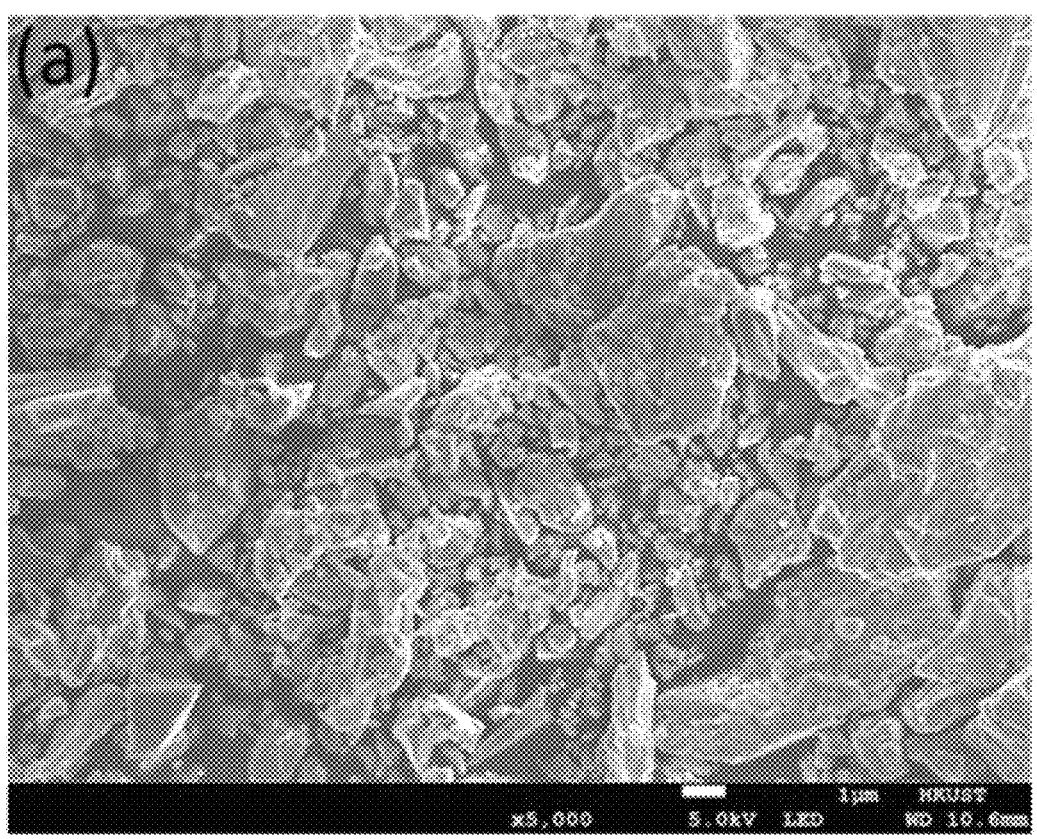
FIGS. 3a-3d are microscope images of bulk Sb$_2$S$_3$ and as-prepared 2D-SS nanosheets using a synthesis method according to an embodiment of the subject invention.
Figure 3B:
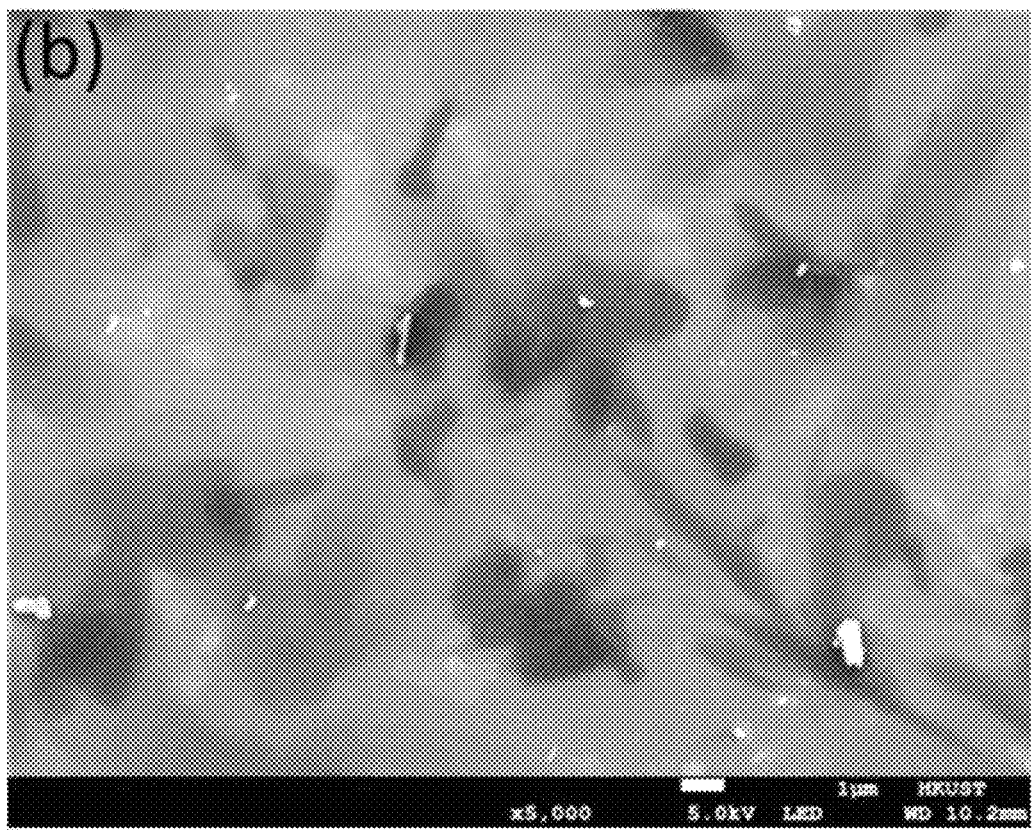
Figure 3C:
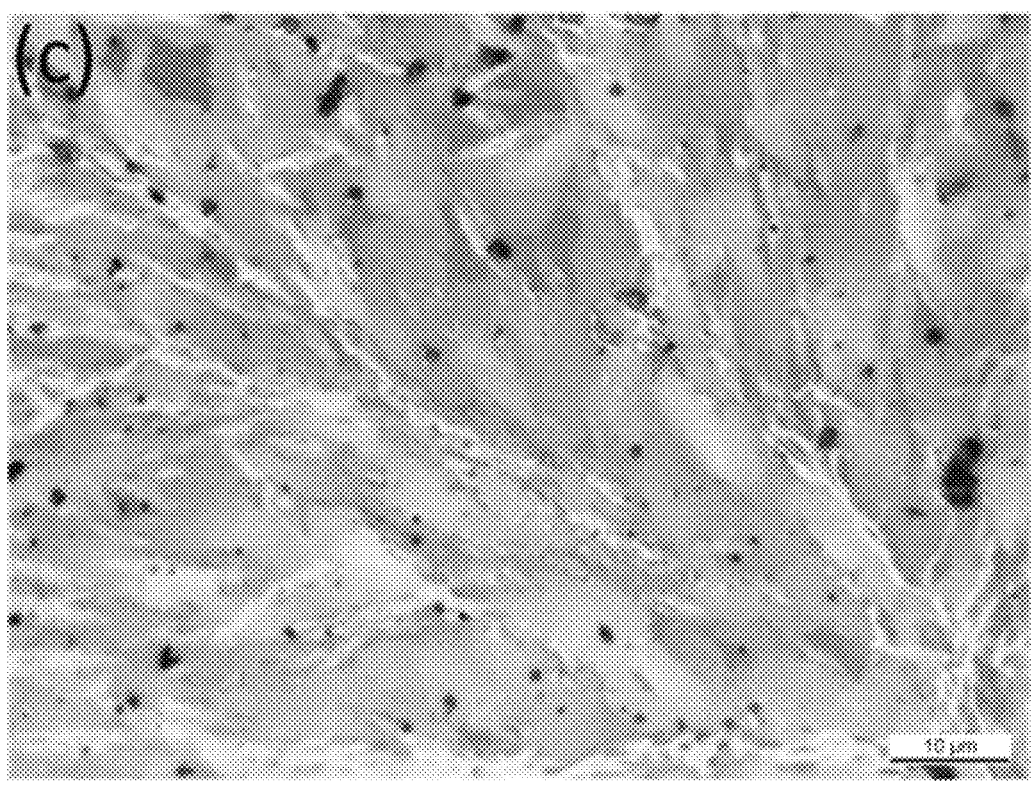
Figure 3D:
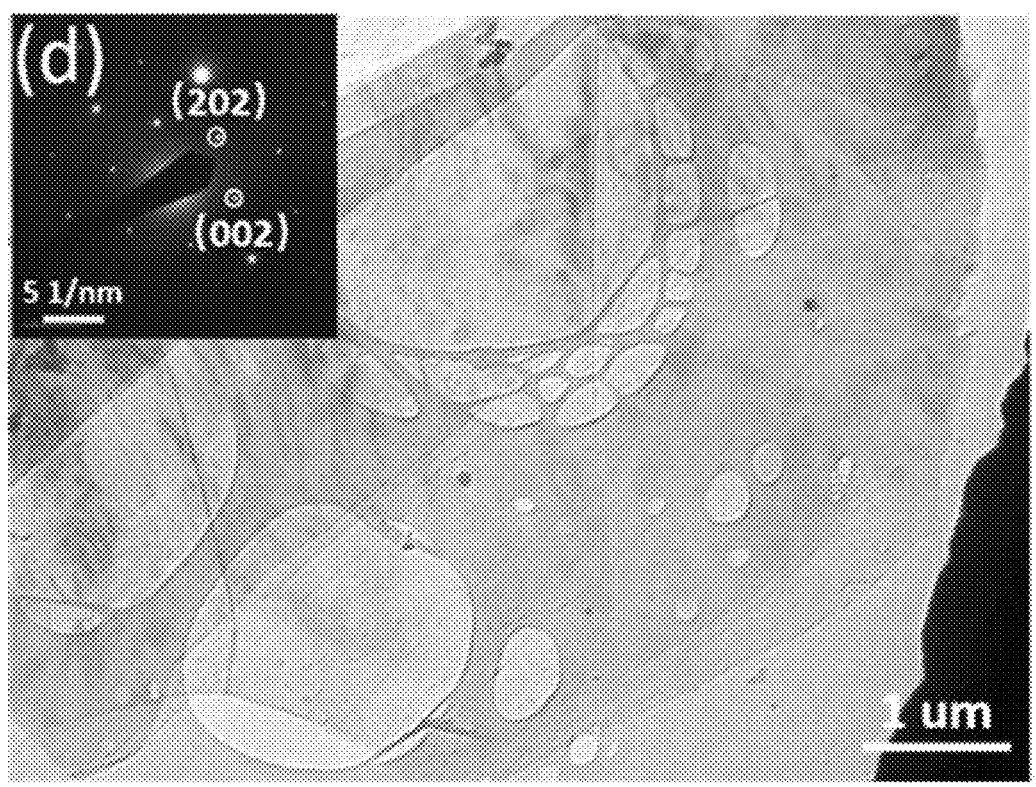

FIGS. 3a-3d are microscope images of bulk $Sb_2S_3$ and as-prepared 2D-SS nanosheets. The morphology of 2D-SS nanosheets is characterized by SEM, OM and TEM techniques. FIG. 3a presents the general morphology of pristine bulk $Sb_2S_3$ precursor before exfoliation, while FIG. 3b demonstrates totally different morphologies. The 2D-SS nanosheets show well-defined layered structure with uniform lateral sizes of several tens of micrometers. FIG. 3c shows the OM image of exfoliated 2D-SS nanosheets on a $SiO_2$/Si film substrate, revealing their high yields and large sizes. FIG. 3d is a TEM image of an individual 2D-SS nanosheet, showing its ultrathin and freestanding nature. The inset in FIG. 3d is the SAED patterns of this nanosheet and the diffraction spots can be indexed to the (202) and (002) planes of orthorhombic stibnite (JCPDS 42-1393) with d-spacings of 1.82 and 1.89 Å, respectively, revealing high crystallinity of nanosheets along the [010] axis.

Figure 4A:
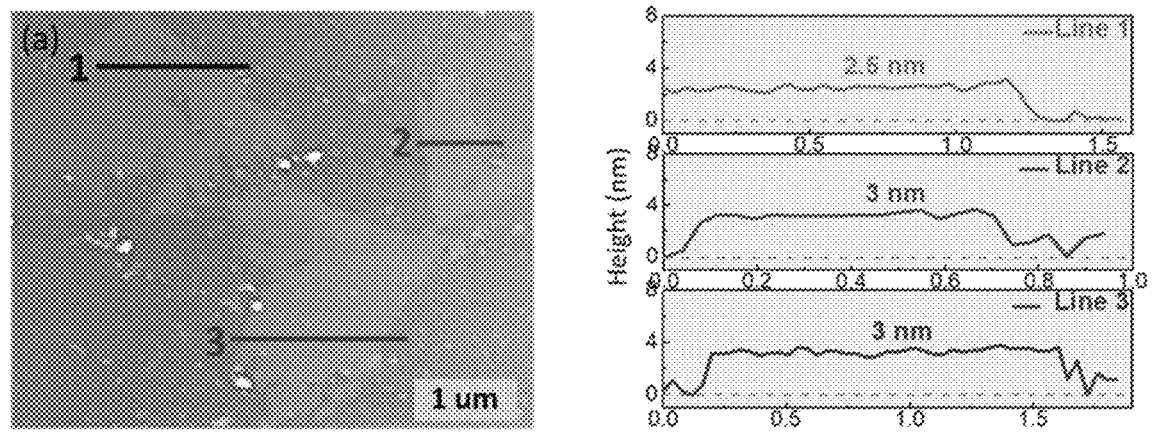
FIGS. 4a-4c show thickness characteristics of as-prepared 2D-SS nanosheets using a synthesis method according to an embodiment of the subject invention.
Figure 4B:
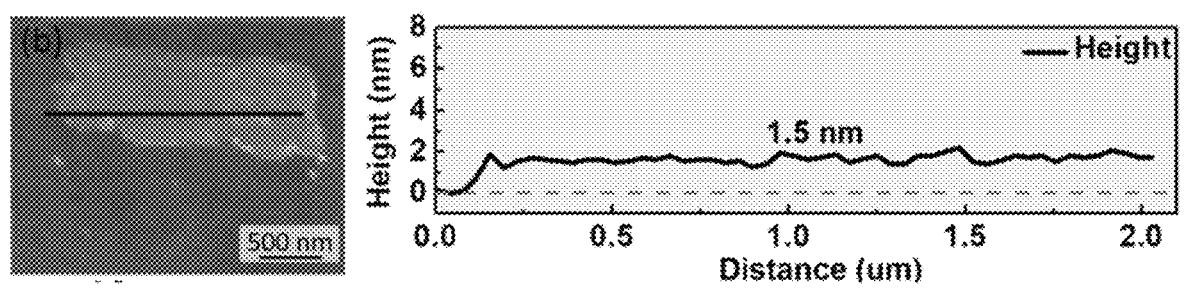
Figure 4C:
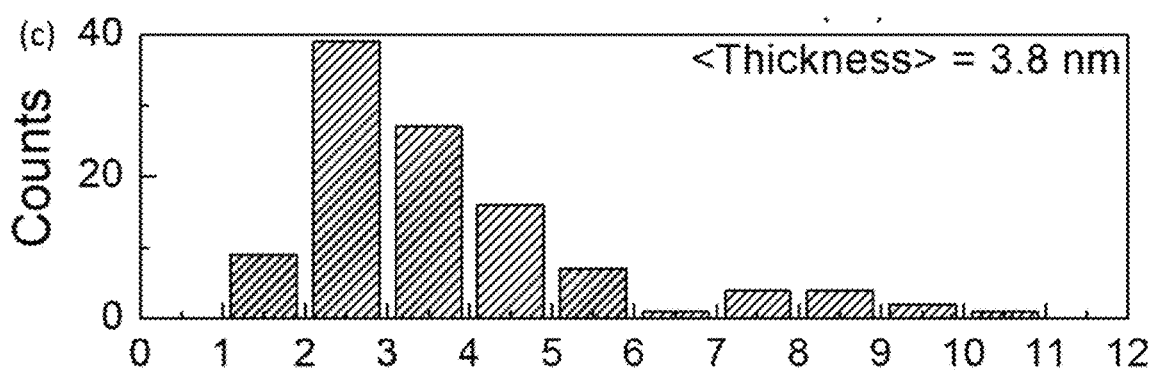

FIGS. 4a-4c show thickness analyses of as-prepared 2D-SS nanosheets. The thickness distribution of 2D-SS nanosheets is examined by AFM examination. FIG. 4a demonstrates the $Sb_2S_3$ nanosheets with typical thickness ranging 2.5 to 3.0 nm, equivalent to 2-3 $Sb_2S_3$ monolayers. FIG. 4b also displays a monolayer $Sb_2S_3$ nanosheet with a thickness of 1.5 nm and a lateral size of larger than 1 µm. FIG. 4c shows the thickness distribution obtained from the height profiles of 110 individual nanosheets, presenting an average thickness of 3.8 nm and more than 80% of the examined nanosheets being thinner than 6 nm.

Figure 5A:
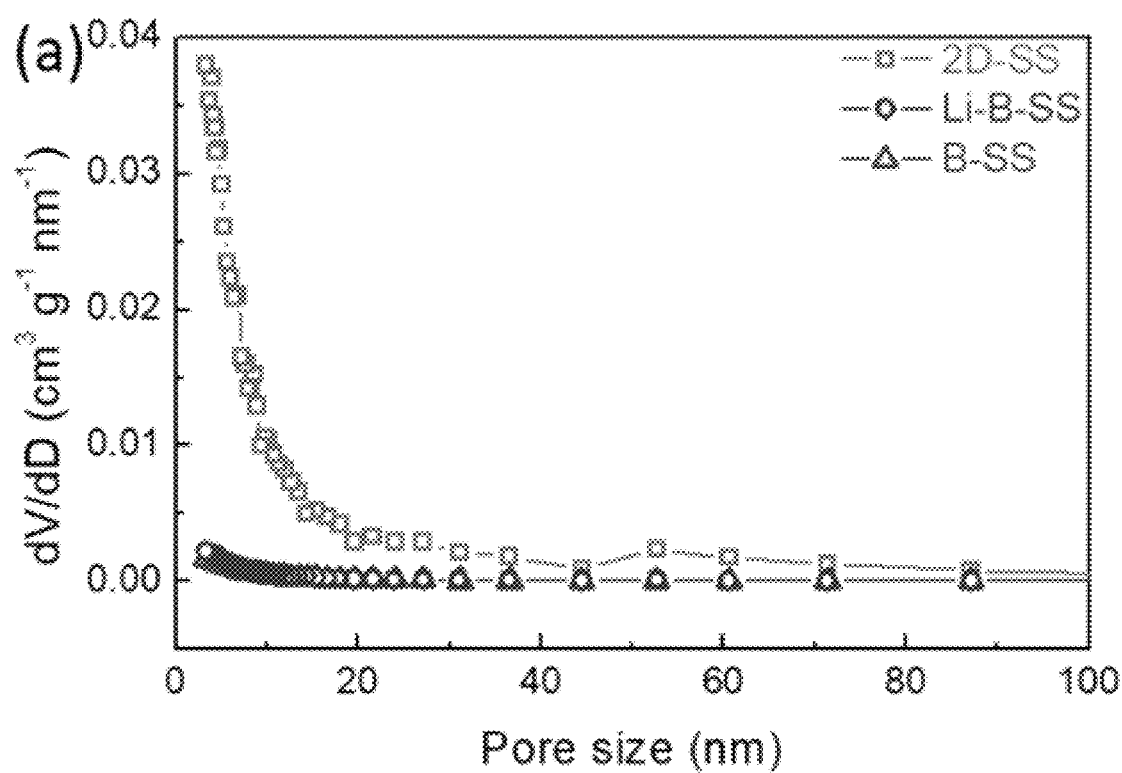
FIG. 5a-5b show the porosity of bulk Sb$_2$S$_3$, Li intercalated bulk Sb$_2$S$_3$, and 2D Sb$_2$S$_3$ nanosheets.
Figure 5B:
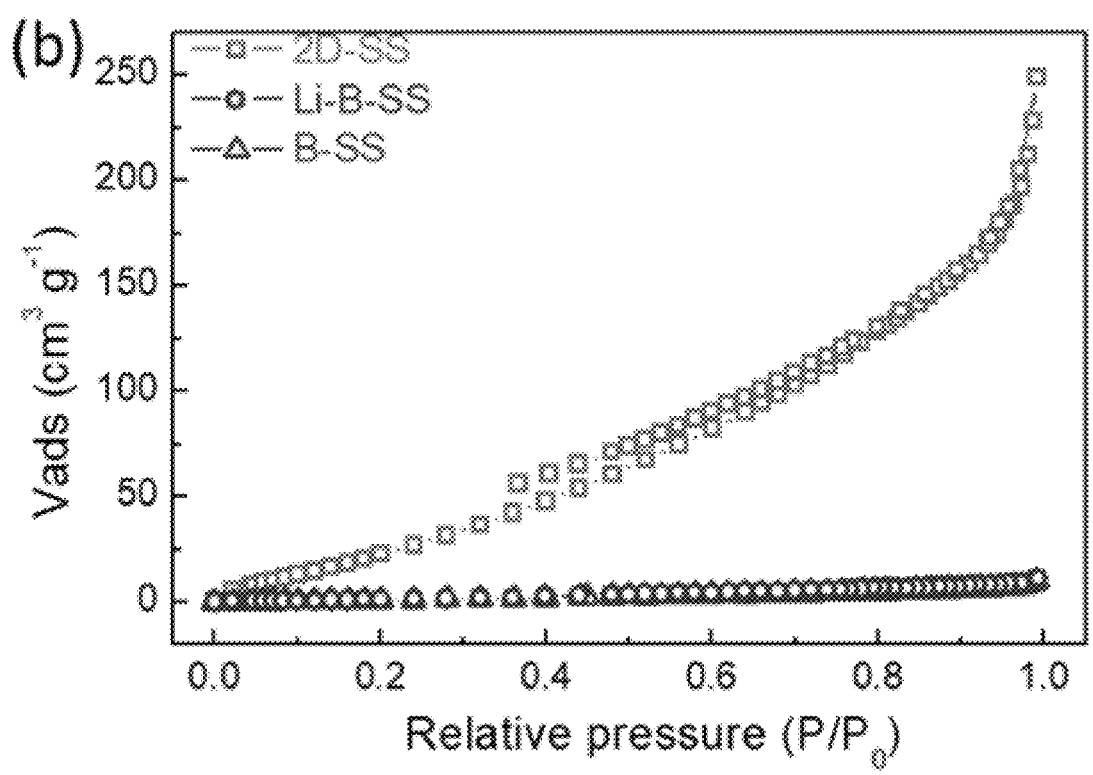

FIGS. 5a-5b show the surface areas and porosities of bulk $Sb_2S_3$, Li intercalated bulk $Sb_2S_3$ and 2D $Sb_2S_3$ nanosheets. The porosities are evaluated using the Brunauer-Emmett-Teller (BET) method and the corresponding surface area/pore volume results are summarized in Table 1. FIG. 5a depicts the pore size distribution while FIG. 5b shows the $N_2$ adsorption/desorption isotherm curves of B-SS, Li-B-SS and 2D-SS nanosheets. In contrast to the non-porous nature of B-SS and Li-B-SS, the small hysteresis observed at a medium pressure range (at $P/P_0$ between 0.4 and 1.0) in the isothermal curve of 2D-SS indicates the existence of abundant mesopores ranging 2-50 nm. The specific surface area and pore volume of prepared 2D-SS nanosheets are 124.23 m$^2$-g$^{-1}$ and 0.3303 cm$^3$-g$^{-1}$, respectively.

Table 1 presents the BET surface areas and BJH pore volumes of B-SS, Li-B-SS and 2D-SS shown in FIGS. 5a-5b.

TABLE 1

|  | B-SS | Li-B-SS | 2D-SS |
| --- | --- | --- | --- |
| BET Surface Area [m$^2$ g$^{-1}$] | 4.566 | 6.224 | 124.23 |
| BJH Pore Volume [cm$^3$ g$^{-1}$] | 0.0131 | 0.0143 | 0.3303 |

Figure 6A:
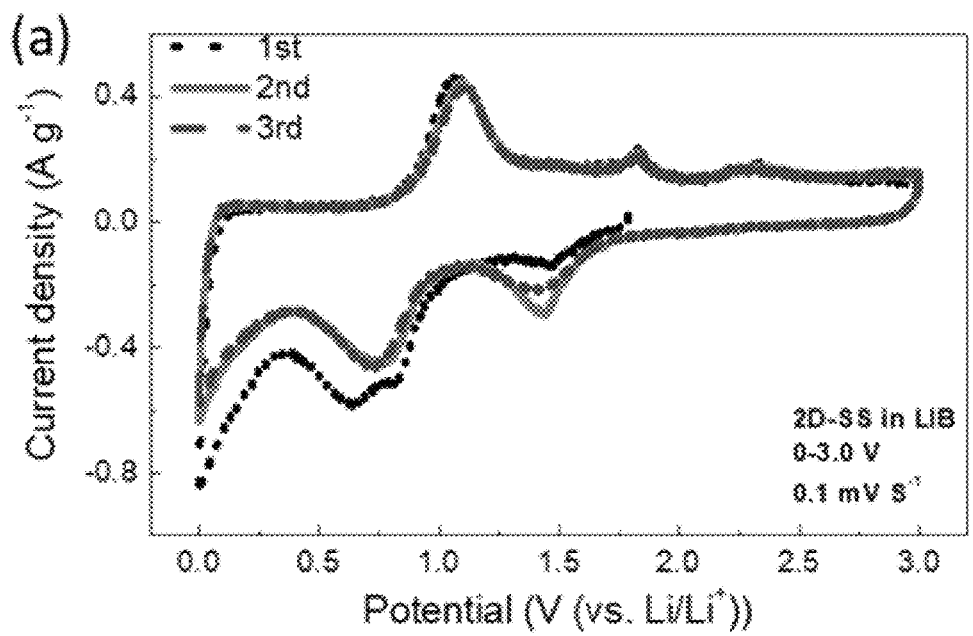
FIGS. 6a-6e show plots of the electrochemical performance of 2D-SS and B-SS electrodes tested in lithium ion batteries (LIBs).
Figure 6B:
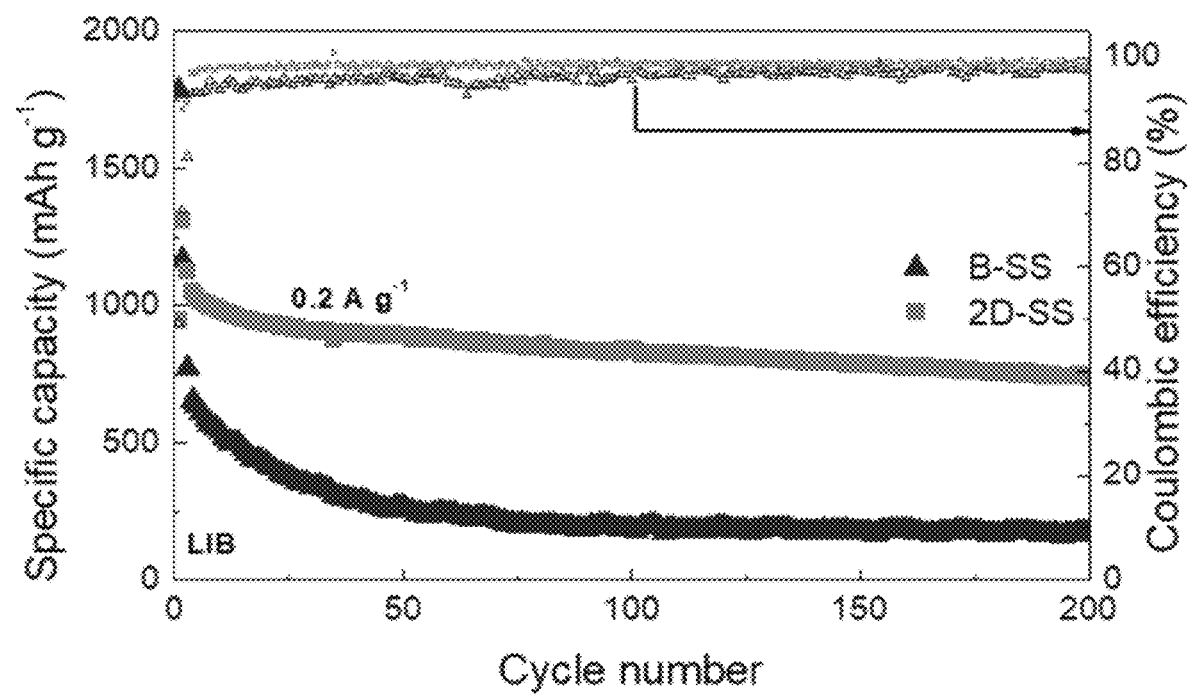
Figure 6C:
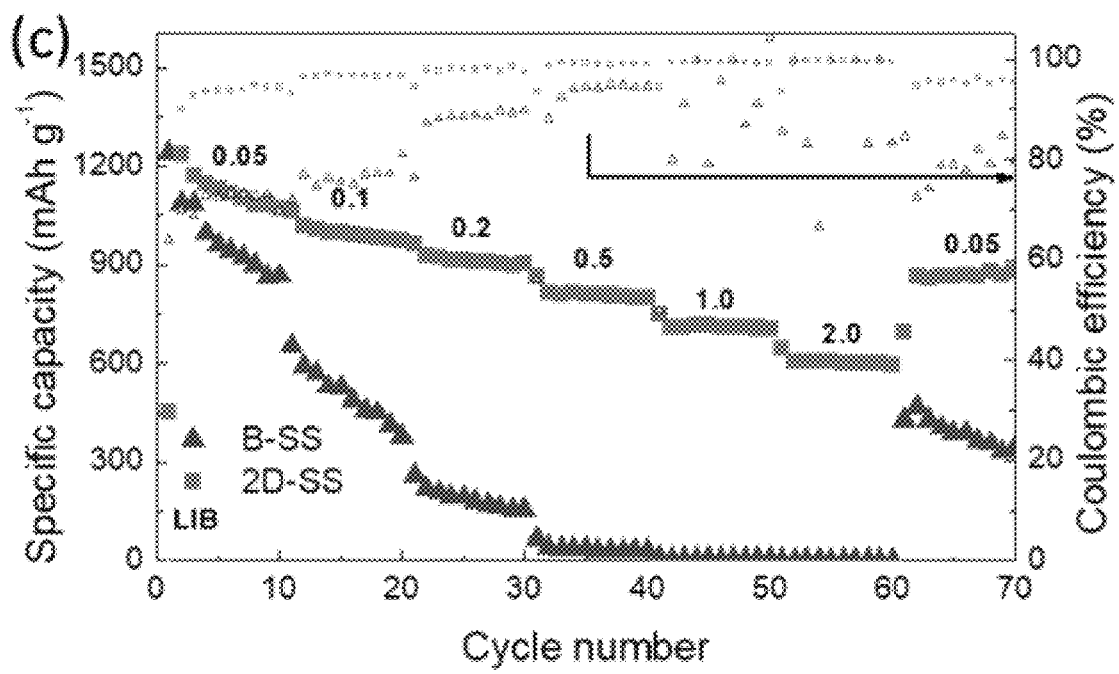
Figure 6D:
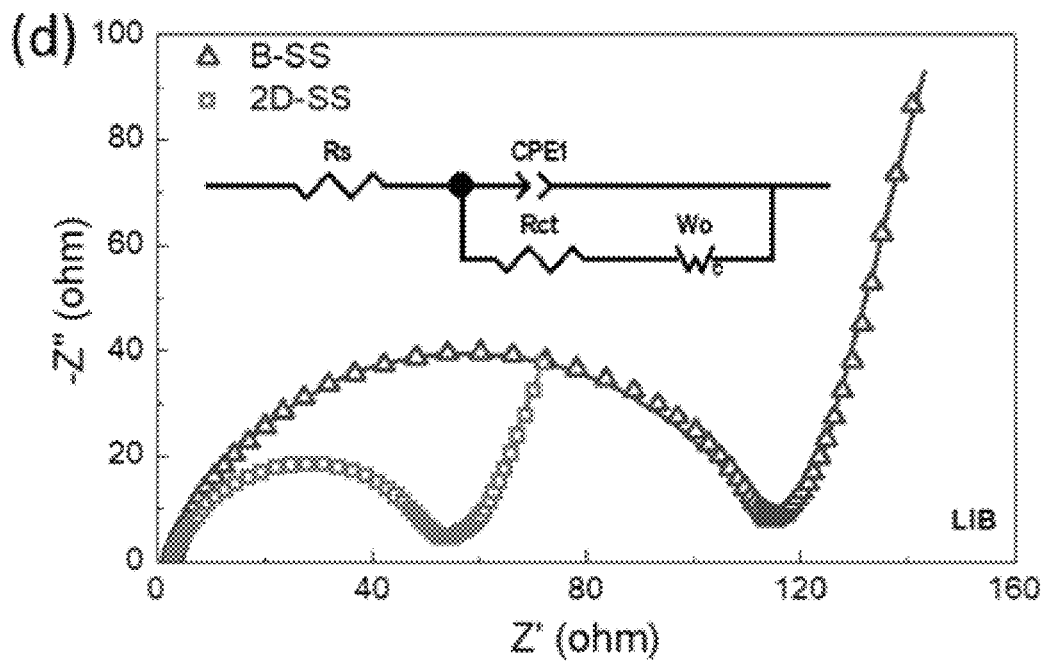
Figure 6E:
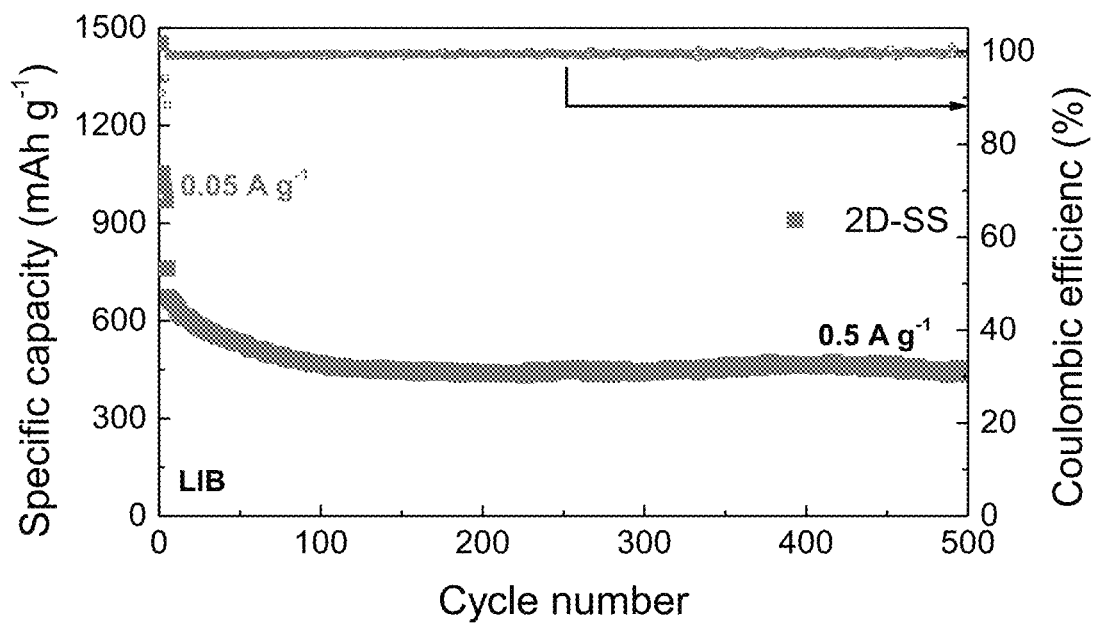

FIGS. 6a-6e present the essential electrochemical properties of the LIBs made from 2D-SS nanosheet according to an embodiment of the subject invention compared with B-SS anodes. FIG. 6a shows the CV curves of LIB with 2D-SS anode measured in the first three cycles at a scan rate of 0.1 mV-s$^{-1}$ between 0 and 3.0 V. FIG. 6b shows the cyclic performance of the 2D-SS and B-SS electrodes tested in LIBs measured at a current density of 0.2 A-g$^{-1}$ for 200 cycles. The 2D-SS anodes display an improved discharge capacity of about 850 mAh-g$^{-1}$ after 200 cycles. FIG. 6c shows the rate capabilities of both 2D-SS and B-SS anodes at current densities ranging 0.05-2.0 A-g$^{-1}$. The 2D-SS anode delivers a reversible capacity of 607 mAh-g$^{-1}$ even at a high current density of 2.0 A-g$^{-1}$, whereas the B-SS anode fails to store any energy under the same condition. To understand the exceptionally high capacities of 2D-SS anodes in LIBs, FIG. 6d and Table 2 show the EIS spectra and electrochemical impedance results. Both the charge transfer resistance ($R_{ct}$) and Warburg impedance (W) of 2D-SS electrode are much lower than those of B-SS electrode, indicating that the former electrode performs better than the later in maintaining fast electron/Li+ ion transfer, leading to improved electrochemical performance of the 2D-SS electrode. FIG. 6e shows the cyclic performance of 2D-SS electrode tested in LIBs measured at a current density of 0.5 A-g$^{-1}$ for 500 cycles.

Table 2 presents the fitted values for the equivalent circuit elements by simulating electrochemical impedance spectroscopy (EIS) data in FIG. 6d. $R_s$=resistance of the electrolyte; $R_{ct}$=kinetic resistance of charge transfer at the electrode/electrolyte interface; and W=Warburg impedance.

Figure 7A:
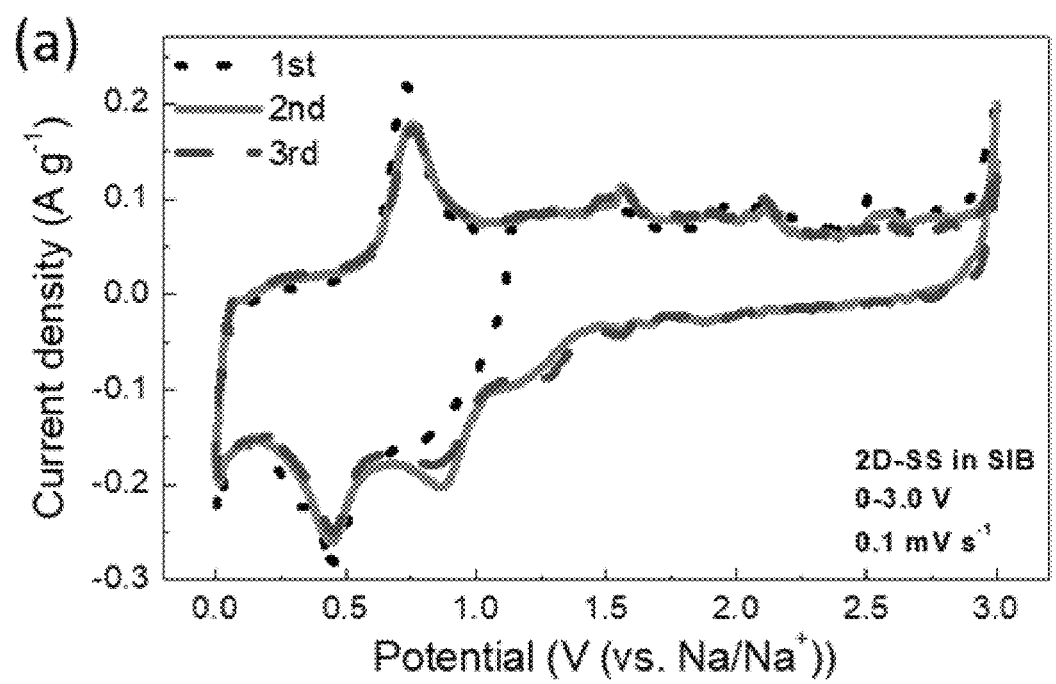
FIGS. 7a-7d show plots of the electrochemical performance of 2D-SS and B-SS electrodes tested in sodium ion batteries (SIBs).
Figure 7B:
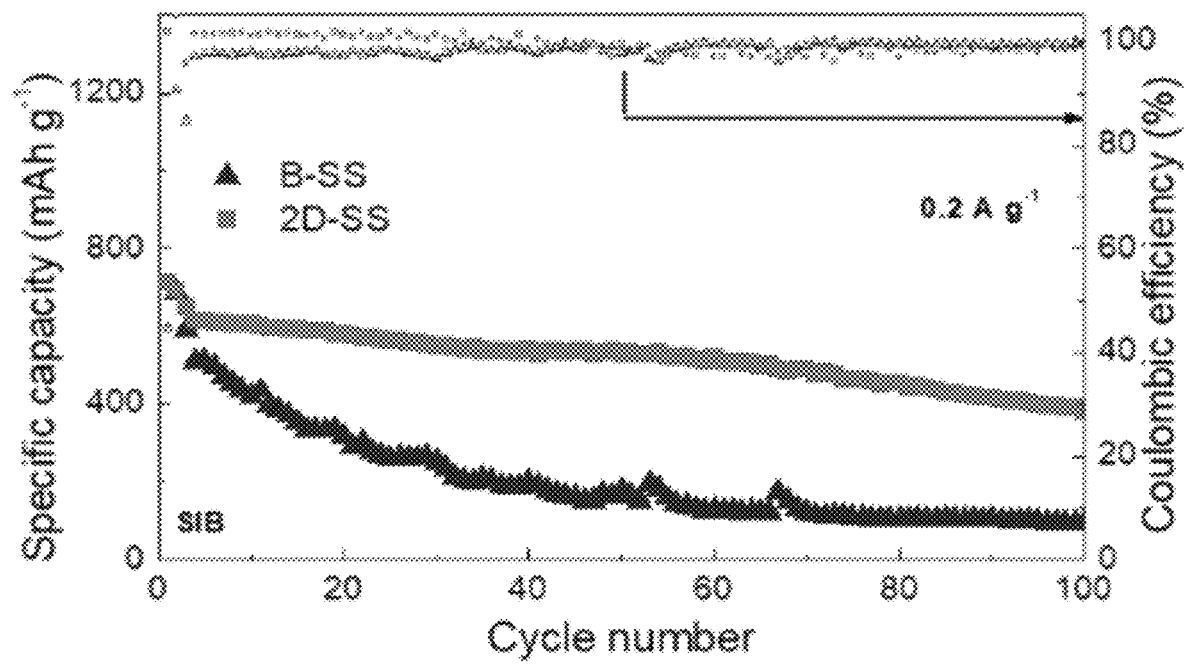
Figure 7C:
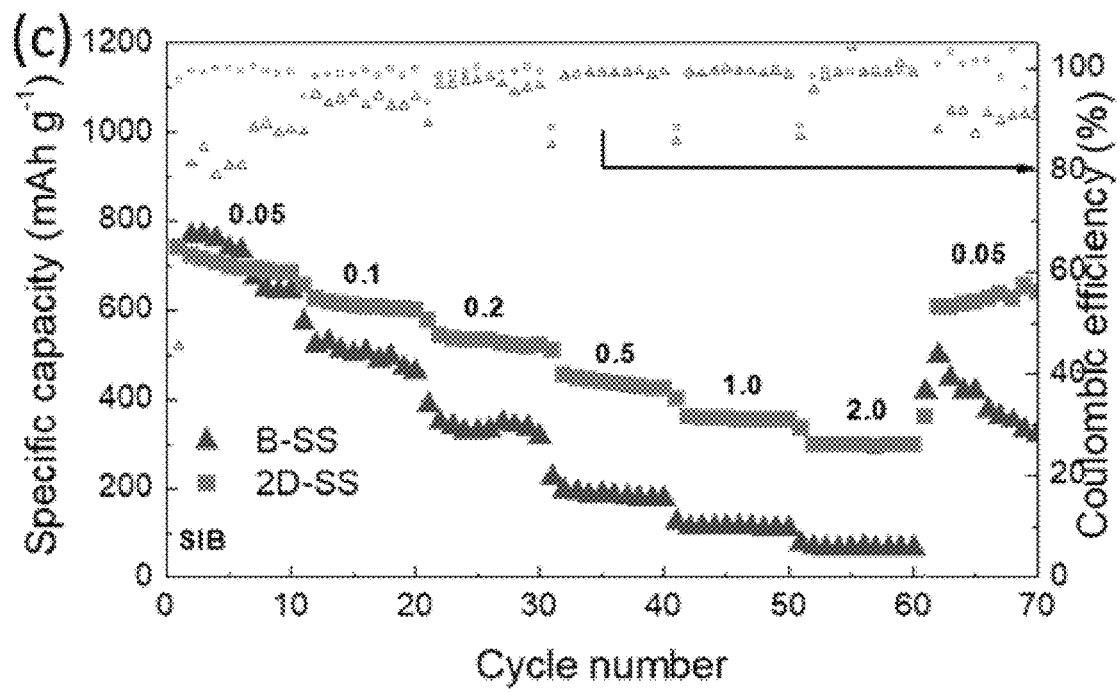

Similarly, FIGS. 7a-7d depict the essential electrochemical properties of the SIBs prepared from 2D-SS anodes according to an embodiment of the subject invention compared with B-SS anodes. FIG. 7a shows the typical CVs of a 2D-SS half-cell over the potential window of 0-3 V versus Na/Na+ in the first three cycles at a scan rate of 0.1 mV-s$^{-1}$. FIG. 7b shows the cyclic performance of 2D-SS and B-SS electrodes tested in SIBs measured at a current density of 0.2 A-g$^{-1}$ for 100 cycles. Different from the rapid capacity fading presented in the B-SS anode, the 2D-SS electrode delivers a steady reversible capacity of over 400 mAh g$^{-1}$ after 100 cycles when tested at 0.2 A-g$^{-1}$. FIG. 7c demonstrates the rate capabilities of both 2D-SS and B-SS electrodes in SIBs at current densities ranging 0.05-2.0 A-g$^{-1}$. The 2D-SS electrode exhibits high rate capabilities with an excellent discharge capacity of 300 mAh-g$^{-1}$ at a high current density of 2.0 A-g$^{-1}$. To offer better understanding of e$^-$/Na+ transfer resistances of these two electrodes in SIBs, FIG. 7d and Table 3 provide the Nyquist plots and electrochemical impedance results measured in the frequency range of 0.1-10$^5$ Hz. The $R_{ct}$ value for SIBs with 2D-SS and B-SS electrodes are 14.45 and 159.7Ω, respectively, a testament to the much higher ionic conductivities for the former than the latter counterpart.

TABLE 2

| LIB | $R_s$ (Ω) | $R_{ct}$ (Ω) | W (Ω) |
| --- | --- | --- | --- |
| 2D-SS | 2.63 | 47.53 | 23.74 |
| B-SS | 2.397 | 107.9 | 30.68 |

Figure 7D:
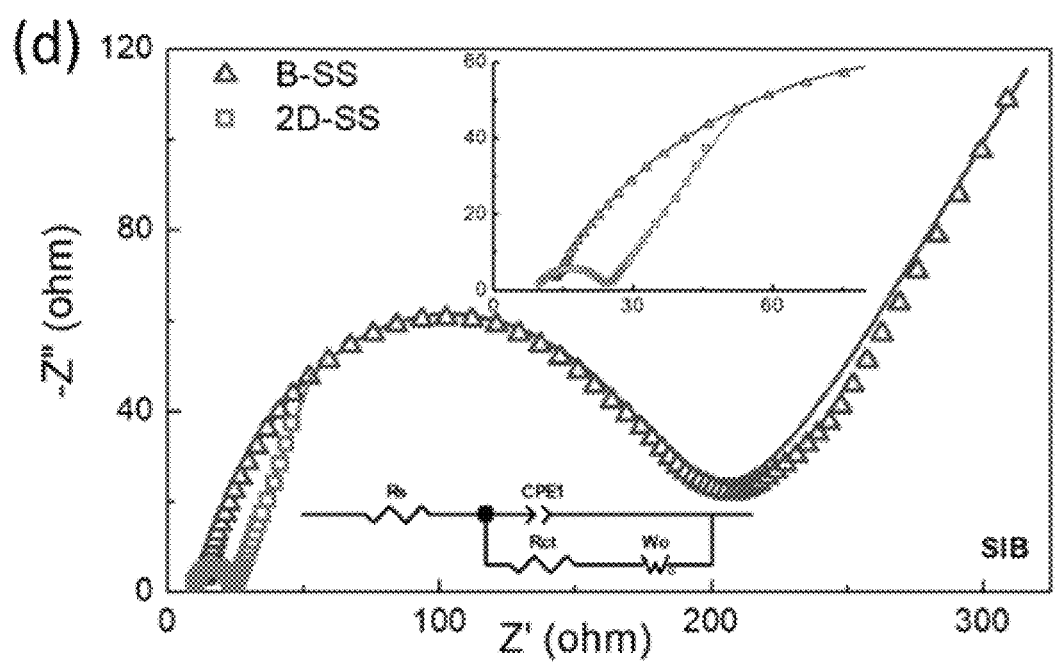

Table 3 presents the fitted values for the equivalent circuit elements by simulating EIS data in FIG. 7d. $R_s$=resistance of the electrolyte; $R_{ct}$=kinetic resistance of charge transfer at the electrode/electrolyte interface; and W=Warburg impedance.

TABLE 3

| SIB | $R_s$ (Ω) | $R_{ct}$ (Ω) | W (Ω) |
| --- | --- | --- | --- |
| 2D-SS | 9.439 | 14.45 | 1.764 |
| B-SS | 12.28 | 159.7 | 110.2 |

Embodiments of the subject invention include processes for the preparation of 2D-SS nanosheets and their applications as bi-functional anodes in both LIBs and SIBs. The process has distinct advantages of scalable production, micron-sized 2D Sb$_2$S$_3$ nanosheets with ultrathin thickness, and excellent electrochemical properties of the resultant 2D-SS anodes. The technique uses the following key processing steps:
1. Synthesis of Li-intercalated Sb$_2$S$_3$ macroparticles using a solvothermal process;
2. Exfoliation of Li-B-SS compounds into freestanding 2D Sb$_2$S$_3$ nanosheets through a sonication process;
3. Separation and washing the Sb$_2$S$_3$ dispersion by centrifugation;
4. Collection of 2D-SS nanosheet powder by freeze drying; and
5. Preparation of anodes comprising 2D-SS nanosheets (optional).

In addition to their application in Li- and Na-ion batteries, the as-prepared Sb$_2$S$_3$ nanosheets can be used in other applications such as solar cells and photodetectors.

In some embodiments, materials other than Sb$_2$S$_3$ nanosheets can be synthesized by the exfoliation method described herein. These include other 2D nanomaterials, such as Sb$_2$Se$_3$, Bi$_2$S$_3$, and Sb$_2$Te$_3$. The starting material of bulk Sb$_2$S$_3$ would be substituted with a bulk starting material of (bulk) Sb$_2$Se$_3$, Bi$_2$S$_3$, and Sb$_2$Te$_3$, respectively.

In some embodiments, in order to further improve the electrochemical properties of prepared Sb$_2$S$_3$ nanosheets in batteries (e.g., LIBs and/or SIGs), other highly conductive additives with optimized contents can also be incorporated into the anodes, such as graphene, carbon nanofibers (CNFs), and carbon nanotubes (CNTs). Anode materials can be prepared by simple mixing of Sb$_2$S$_3$ nanosheets active materials, various conductive agents, and binder at different ratios with a solvent (e.g., DI water). The uniformly mixed slurry can then be cast onto a copper foil to form a thin film. After drying in a vacuum oven, the anode electrodes can be cut into discs.

Following are examples that illustrate procedures for practicing embodiments of the invention. These examples should not be construed as limiting.

Materials

The following reagents and solvents can be used without further purification: antimony (III) sulfide (Sb$_2$S$_3$, Aldrich), lithium carbonate (Li$_2$CO$_3$, Aladdin), benzyl alcohol (puriss, Sigma-Aldrich), N-methyl-2-pyrrolidone (NMP, 99.5%, Sigma-Aldrich), hydrochloric acid (HCl, supplied by Sigma), acetone (Fisher), Ketjenblack, carbon nanotube (CNT, supplied by Iljin Nanotech) and carboxymethyl cellulose (CMC, $M_W$ 250 K), liquid LIB electrolyte (1 M LiPF$_6$ in EC:EMC:DMC (1:1:1 vol %) with 1 wt % of VC, MTI-Group), sodium trifluoromethanesulfonate (NaCF$_3$SO$_3$), diethylene glycol dimethyl ether (DEGDME), glass fiber mat (Whatman, Grade GF/D).

Example 1—Synthesis of 2D-SS Nanosheets

In step 1, the simple and scalable solvothermal method is adopted to prepare Li-intercalated Sb$_2$S$_3$ (Li-B-SS) macroparticles. Bulk Sb$_2$S$_3$ powders are used as the precursor for exfoliation and Li$_2$CO$_3$ salt is served as the intercalating agent. The solvothermal solution is prepared by adding 0.1 g bulk Sb$_2$S$_3$ (B-SS, which can be supplied by Aldrich) and 0.7 g lithium carbonate (Li$_2$CO$_3$, which can be supplied by Aladdin) in 40 ml benzyl alcohol (which can be supplied by Sigma-Aldrich) by magnetic stirring for 0.5 h at room temperature (RT). Then, the resulting mixture is transferred to a 50 ml poly (p-phenylene)-lined stainless steel autoclave, sealed and heated to 220° C. for 48 h. Upon cooling to RT after the solvothermal process, the final solid product is collected after centrifugation at 12,000 rpm for 20 min. The product is further washed with acetone twice to eliminate the residual benzyl alcohol. Subsequently, the Li-B-SS macroparticles are collected after drying in a vacuum oven at 50° C. overnight.

In step 2, an easy and direct liquid sonication process is used to exfoliate the Li-B-SS compounds into 2D $Sb_2S_3$ nanosheets. Generally, 1 g Li-B-SS macroparticles prepared by solvothermal treatment are added to a $N_2$ bubbled mixture of 100 ml DI water and 100 ml NMP (which can be supplied by Sigma). The mixture is then sealed in a bottle and sonicated in a bath ultrasonicator (Branson 1510) for several hours. During the sonication process, the light grey color of $Sb_2S_3$ suspension is changed to dark brown, indicating production of abundant few-layer $Sb_2S_3$ nanosheets.

In step 3, in order to eliminate the un-exfoliated B-SS/Li-B-SS particles after sonication, the dark brown $Sb_2S_3$ dispersion is centrifuged at 500 rpm for 1 h and the top ¾ of suspension is selected as the few-layer $Sb_2S_3$ dispersion. After centrifugation at 12,000 rpm for 20 min, the product is further centrifuged in 1 wt % diluted hydrochloric acid (HCl, which can be supplied by Sigma) to eliminate the excess $Li_2CO_3$ salt. The light brown colored few-layer $Sb_2S_3$ dispersion is obtained after washing the few-layer $Sb_2S_3$ with DI water several times.

In step 4, to avoid restacking of synthesized $Sb_2S_3$ nanosheets, a freeze-drying method is adopted to obtain dried $Sb_2S_3$ nanosheet powder. The obtained light brown $Sb_2S_3$ DI water dispersion is dried in a freeze dryer for 48 h and cameo brown $Sb_2S_3$ nanosheet powder is successfully achieved.

Example 2—Synthesis of Anodes Comprising 2D-SS Nanosheets

Picking up after step 4 of Example 1, in step 5 the synthesized 2D-SS nanosheet powders are mixed with carbon black (Ketjenblack), carbon nanotube (CNT, which can be supplied by Iljin Nanotech) and carboxymethyl cellulose (CMC, $M_W$ 250,000) binder at a mass ratio of 6:2:1:1 using few drops of DI water to form a slurry. The slurry is magnetically stirred overnight (~12 h) and coated uniformly onto a copper foil to form a thin film and dried at 60° C. in a vacuum oven for 12 h. After the moisture is fully evaporated, the electrodes are cut into circular pieces of 12 mm in diameter for electrochemical testing.

Example 3—Characterization of 2D-SS Nanosheets

The morphologies were characterized using an optical microscopy (BH2-MJLT, Olympus), a scanning electron microscope (SEM, 6700F), and a transmission electron microscope (TEM, JEOL2010). The thicknesses were measured by atomic force microscopy (AFM, Dimension 3100, Digital Instruments). The $N_2$ adsorption/desorption isotherms were obtained at 77 K using an automated adsorption apparatus (Micromeritics, ASAP 2020). The surface areas and pore size distributions were determined based on the Brunauer-Emmett-Teller (BET) equation and Barrett-Joyner-Halenda (BJH) method, respectively. The electrochemical performances were measured on a battery testing system (Land 2001CT). The CV tests and the EIS are performed on an electrochemical workstation (CHI 660C).

The 2D-SS nanosheets with large lateral size and ultrathin thickness were prepared using the chemical Li intercalation-assisted exfoliation method of Example 1. The 2D-SS electrodes were fabricated through a slurry coating procedure and tested as bi-functional anodes in both LIBs and SIBs.

The morphologies of B-SS were characterized by SEM. The morphologies of 2D-SS nanosheets were characterized by optical microscopy (OM), SEM, and TEM. The thickness of as-prepared 2D-SS nanosheets was measured on an AFM. The porosities of 2D-SS nanosheets, B-SS, and Li-B-SS were determined by $N_2$ adsorption/desorption isotherms, where the specific surface areas and the pore size distributions were evaluated by BET and BJH methods, respectively.

FIG. 3a is a low magnification SEM image of original bulk $Sb_2S_3$ powders before exfoliation, which presents an irregularly granular morphology with particle size as large as tens of micrometers. FIG. 3b shows the well-defined layered structure of prepared 2D-SS nanosheets with well-maintained lateral size of micrometers. FIG. 3c is the optical micrograph of exfoliated 2D-SS nanosheets on a $SiO_2$/Si film substrate, revealing both their large size and high yields. FIG. 3d displays the TEM image and the corresponding SAED patterns (inset), which presents a freestanding, high-quality $Sb_2S_3$ nanosheet with a single crystal in nature. The SAED patterns indicate the prepared 2D $Sb_2S_3$ nanosheets composing of the (010) planes.

FIG. 4a shows the tapping-mode AFM image and the corresponding height profiles, exhibiting their thicknesses of 2.5-3 nm, equivalent to 2-3 unit cell thickness of $Sb_2S_3$ sheets across the [010] direction. FIG. 4b also confirms successful exfoliation of monolayer $Sb_2S_3$ sheets with a thickness of 1.5 nm, a testament to high efficiency of the chemical Li intercalation-assisted exfoliation approach described in the current disclosure. In order to better illustrate the thickness distribution of prepared 2D $Sb_2S_3$ nanosheets, 110 individual nanosheets are tested and FIG. 4c shows the thickness histogram. Over 80% of the examined nanosheets are thinner than 6 nm and the average thickness of prepared 2D $Sb_2S_3$ nanosheets is ~3.8 nm.

FIGS. 5a-5b depict the pore size distributions and $N_2$ adsorption/desorption isotherm curves of B-SS, Li-B-SS and 2D $Sb_2S_3$ nanosheets. Table 1 shows the surface areas and pore volumes calculated using the BET and BJH methods, respectively. As shown in FIG. 5a, the pristine B-SS particles have a non-porous structure with an extremely small surface area of 4.566 $m^2 \cdot g^{-1}$ and a pore volume of 0.0131 $cm^3 \cdot g^{-1}$. After the initial solvothermal process, the resultant Li-B-SS compounds maintain their structural integrity, showing a similar pore volume and surface area. As expected, both the surface area and pore volume of prepared 2D-SS nanosheets increase to 124.23 $m^2$ $g^{-1}$ and 0.3303 $cm^3$ $g^{-1}$, which is another solid evidence for the successful exfoliation of few-layer $Sb_2S_3$ nanosheets. The small hysteresis loop existing at $P/P_0$ between 0.4 and 1.0 in the isothermal curve of 2D-SS (FIG. 5b) reveals the presence of abundant mesopores (2-50 nm) between the nanosheets, which can facilitate easy access by the electrolyte in the batteries.

Example 4—Characterization of LIBs Comprising 2D-SS Nanosheets and Sibs Comprising 2D-SS Nanosheets The 2D-SS and B-SS anodes were prepared by mixing active materials, carbon black, CNTs and CMC binder at a mass ratio of 6:2:1:1 with DI water as the solvent. The uniformly mixed slurry was cast onto a copper foil to form a thin film. After drying at 60° C. overnight in a vacuum oven, the anode electrodes were cut into discs of 12 mm in diameter. For LIBs, CR2032 coin cells were assembled in an Ar-filled glovebox using 2D-SS or B-SS as the anode and lithium foil as the counter electrode. The 1 M lithium hexafluorophosphate (LiPF$_6$) dissolved in ethylene carbonate (EC), ethyl methyl carbonate (EMC) and dimethyl carbonate (DMC) (1:1:1 vol %) with 1 wt % of vinylene carbonate (VC) was used as the electrolyte, and the polyethylene membrane (Celgard 2400) was employed as the separator. In addition, SIBs were assembled using sodium foil as the counter electrode. 1 M sodium trifluoromethanesulfonate (NaCF$_3$SO$_3$) in diethylene glycol dimethyl ether (DEGDME) was prepared as the electrolyte and a glass fiber mat (Whatman, Grade GF/D) was used as the separator.

The prepared half cells were cycled at different current densities between 0.005 and 3.0 V on a LAND 2001CT battery tester. Cyclic voltammetry (CV) curves were obtained on a CHI660c electrochemical workstation between 0 and 3.0 V at a scan rate of 0.1 mV·s$^{-1}$. Electrochemical impedance spectra (EIS) were measured on the CHI660c electrochemical workstation at a constant perturbation amplitude of 5 mV in the frequency range from 0.1 Hz to 10$^5$ Hz.

FIGS. 6a-6e show the electrochemical performance of the 2D-SS and B-SS anodes measured using CR2032 coin cells in LIBs. FIG. 6a depicts the CV curves of 2D-SS anode scanned at 0.1 mV s$^{-1}$ in LIBs in the first three cycles. In the first scan, the broad peak located at 0.5~0.8 V is attributed to the formation of a stable solid electrolyte interphase (SEI) layer. In the cathodic process, the peaks located at 1.43 and 0.74 V can be attributed to the conversion and alloying reactions, respectively. As for the anodic process, the reversible two peaks centered at 1.08 and 1.80 V result from the stepwise delithiation reactions of Li$_3$Sb and Li$_2$S.

FIG. 6b presents the cyclic capacities of 2D-SS and B-SS anodes at a current density of 0.2 A·g$^{-1}$ in LIBs. The well-designed 2D-SS anode delivers a very stable capacity of ~850 mAh·g$^{-1}$ after 200 cycles at 0.2 A·g$^{-1}$ and an excellent Coulombic efficiency over 98%, indicating the favorable electron/ion transport in the ultrathin Sb$_2$S$_3$ nanosheets.

FIG. 6c displays the rate capacities of 2D-SS and B-SS anodes at a current density ranging from 0.05 to 2.0 A·g$^{-1}$. The 2D-SS electrode displays steady reversible discharge capacities of 1070, 980, 900, 810, 710 and 607 mAh·g$^{-1}$ at 0.05, 0.1, 0.2, 0.5, 1.0 and 2.0 A·g$^{-1}$, respectively, whereas the B-SS counterpart delivers very poor discharge capacities, especially at high current densities of over 0.5 A·g$^{-1}$, supporting the exceptional Li$^+$ storage performance in the former electrode.

The EIS analysis is also carried out with these two electrodes in the frequency range of 0.1-10$^5$ Hz, as shown in FIG. 6d, while Table 2 shows the impedance data examined using the Z-view software simulation, including the resistance of electrolyte (R$_s$), charge transfer resistance (R$_{ct}$) and Warburg resistance (W). The R$_{ct}$ of 2D-SS electrode is 47.53Ω, far lower than 107.9Ω for B-SS anode, a solid evidence of favorable electron transport and easy penetration of the former electrode by the electrolyte. FIG. 6e shows the cyclic performance of the 2D-SS electrode tested in the LIB measured at a current density of 0.5 A·g$^{-1}$ for 500 cycles.

FIGS. 7a-7d present the corresponding Na$^+$ storage performance of 2D-SS and B-SS anodes. FIG. 7a shows the CV curves of the 2D-SS half-cell carried out over the potential window from 0 to 3.0 V at a scan rate of 0.1 mV·s$^{-1}$ in the first three cycles. The difference between the 1$^{st}$ and the following cycles indicates the gradually activated process. The broad peak in the 1$^{st}$ cycle at 0.8~1.1 V can be ascribed to the formation of a SEI layer and the intercalation of Na$^+$ ions into the Sb$_2$S$_3$ layers. The three cathodic peaks at 1.26, 0.86 and 0.45 V are attributed to the Na$^+$ ion intercalation, conversion and alloying reactions, respectively. Conversely, the three current peaks located at 0.75, 1.54, and 2.10 V in the anodic scans correspond to the reversible formation of Sb, Sb$_2$S$_3$, and the extraction of Na$^+$ ions, respectively.

FIG. 7b depicts the cyclic performance of 2D-SS and B-SS anodes measured at 0.2 A·g$^{-1}$ for 100 cycles. The 2D-SS electrode delivers a 500 mAh·g$^{-1}$ when texted at 0.2 A·g$^{-1}$. In contrast, the B-SS electrode presents rapid capacity fading in the first 10 cycles due to the electrode pulverization and loss of contacts between the active materials and current collector.

FIG. 7c displays the rate capabilities of these two electrodes measured at current densities ranging 0.05-2.0 A·g$^{-1}$. The 2D-SS electrode exhibits much better rate capabilities than the B-SS counterpart with average discharge capacities of 690, 600, 530, 430, 360 and 300 mAh·g$^{-1}$ at current densities of 0.05, 0.1, 0.2, 0.5, 1 and 2 A·g$^{-1}$, respectively.

To clarify the favorable electrochemical performance of the 2D-SS electrode, the EIS spectra are compared between the 2D-SS and B-SS electrodes as shown in FIG. 7d, while the corresponding Z-view software simulation results for an equivalent circuit are given in Table 3. All impedance parameters, including the electrolyte resistance (R$_s$), charge transfer resistance (R$_{ct}$) and Warburg impedance (W), of the 2D-SS electrode are much lower than those of the B-SS counterpart. These outstanding electrochemical performances of the 2D-SS electrode are attributed to the synergetic effects of ameliorating structural features, such as ultrathin thicknesses facilitating electron/ion transfer, abundant active sites for surface redox reactions and large aspect ratios for effective electrolyte penetration.

Although exemplary embodiments are described herein, it will be understood that many additional changes in terms of materials, solvothermal parameters, intercalating agent ratios, sonication conditions, centrifugation parameters, and arrangement of parts in batteries, which have been herein described and illustrated to explain the nature of the subject matter, may be made by those skilled in the art within the principle and scope of the disclosure as expressed in the appended claims.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

All patents, patent applications, provisional applications, and publications referred to or cited herein are incorporated by reference in their entirety, including all figures and tables, to the extent they are not inconsistent with the explicit teachings of this specification.

What is claimed is:

1. A method for synthesizing two-dimensional (2D) nanosheets, the method comprising:
   providing a bulk precursor;
   performing solvothermal intercalation of lithium (Li) atoms into van der Waals bonded interlayers of particles of the bulk precursor in the presence of a solvent to form Li-intercalated bulk compounds;

performing a sonication process on the Li-intercalated bulk compounds to exfoliate the Li-intercalated bulk compounds into 2D nanosheets;

performing a centrifugation process to separate the exfoliated 2D nanosheets and then washing the exfoliated 2D nanosheets;

freeze drying the separated and washed 2D nanosheets; and collecting the 2D nanosheets after freeze drying, wherein: a) the bulk precursor is a $Sb_2S_3$ bulk precursor and the collected 2D nanosheets are $Sb_2S_3$ 2D nanosheets; b) the bulk precursor is a $Sb_2Se_3$ bulk precursor and the collected 2D nanosheets are $Sb_2Se_3$ 2D nanosheets; c) the bulk precursor is a $Bi_2S_3$ bulk precursor and the collected 2D nanosheets are $Bi_2S_3$ 2D nanosheets; or d) the bulk precursor is a $Sb_2Te_3$ bulk precursor and the collected 2D nanosheets are $Sb_2Te_3$ 2D nanosheets.

2. The method according to claim 1, wherein the bulk precursor is a $Sb_2S_3$ bulk precursor and the collected 2D nanosheets are $Sb_2S_3$ 2D nanosheets.

3. The method according to claim 2, wherein freeze drying the separated and washed 2D nanosheets comprises freeze drying the separated and washed 2D nanosheets into a 2D nanosheet powder comprising the 2D nanosheets, and wherein collecting the 2D nanosheets after freeze drying comprises collecting the 2D nanosheet powder after freeze drying.

4. The method according to claim 2, wherein the solvent is benzyl alcohol.

5. The method according to claim 2, wherein the sonication process is a mild bath sonication process comprising sonicating in a mixture of deionized water and N-methyl-2-pyrrolidone (DI water/NMP).

6. The method according to claim 2, wherein washing the exfoliated 2D nanosheets comprises washing the exfoliated 2D nanosheets a plurality of times with diluted HCl and DI water.

7. The method according to claim 2, wherein the collected 2D nanosheets have a thickness of less than 5 nm each.

8. The method according to claim 2, wherein freeze drying the separated and washed 2D nanosheets comprises freeze drying the separated and washed 2D nanosheets into a 2D nanosheet powder comprising the 2D nanosheets, wherein collecting the 2D nanosheets after freeze drying comprises collecting the 2D nanosheet powder after freeze drying, wherein the solvent is benzyl alcohol, wherein the sonication process is a mild bath sonication process comprising sonicating in a mixture of DI water/NMP, wherein washing the exfoliated 2D nanosheets comprises washing the exfoliated 2D nanosheets a plurality of times with diluted HCl and DI water, and wherein the collected 2D nanosheets have a thickness of less than 5 nm each.

9. The method according to claim 1, wherein freeze drying the separated and washed 2D nanosheets comprises freeze drying the separated and washed 2D nanosheets into a 2D nanosheet powder comprising the 2D nanosheets, and wherein collecting the 2D nanosheets after freeze drying comprises collecting the 2D nanosheet powder after freeze drying.

10. The method according to claim 1, wherein the solvent is benzyl alcohol.

11. The method according to claim 1, wherein the sonication process is a mild bath sonication process comprising sonicating in a mixture of DI water/NMP.

12. The method according to claim 1, wherein washing the exfoliated 2D nanosheets comprises washing the exfoliated 2D nanosheets a plurality of times with diluted HCl and DI water.

13. The method according to claim 1, wherein the collected 2D nanosheets have a thickness of less than 5 nm each.

14. The method according to claim 1, wherein freeze drying the separated and washed 2D nanosheets comprises freeze drying the separated and washed 2D nanosheets into a 2D nanosheet powder comprising the 2D nanosheets, wherein collecting the 2D nanosheets after freeze drying comprises collecting the 2D nanosheet powder after freeze drying, wherein the solvent is benzyl alcohol, wherein the sonication process is a mild bath sonication process comprising sonicating in a mixture of DI water/NMP, wherein washing the exfoliated 2D nanosheets comprises washing the exfoliated 2D nanosheets a plurality of times with diluted HCl and DI water, and wherein the collected 2D nanosheets have a thickness of less than 5 nm each.

15. A method for synthesizing an anode comprising two-dimensional (2D) nanosheets, the method comprising:

providing a bulk precursor;

performing solvothermal intercalation of lithium (Li) atoms into van der Waals bonded interlayers of particles of the bulk precursor in the presence of a solvent to form Li-intercalated bulk compounds;

performing a sonication process on the Li-intercalated bulk compounds to exfoliate the Li-intercalated bulk compounds into 2D nanosheets;

performing a centrifugation process to separate the exfoliated 2D nanosheets and then washing the exfoliated 2D nanosheets;

freeze drying the separated and washed 2D nanosheets;

collecting the 2D nanosheets after freeze drying; and depositing the collected 2D nanosheets on a conductive substrate and heating to form the anode, wherein: a) the bulk precursor is a $Sb_2S_3$ bulk precursor and the collected 2D nanosheets are $Sb_2S_3$ 2D nanosheets; b) the bulk precursor is a $Sb_2Se_3$ bulk precursor and the collected 2D nanosheets are $Sb_2Se_3$ 2D nanosheets; c) the bulk precursor is a $Bi_2S_3$ bulk precursor and the collected 2D nanosheets are $Bi_2S_3$ 2D nanosheets; or d) the bulk precursor is a $Sb_2Te_3$ bulk precursor and the collected 2D nanosheets are $Sb_2Te_3$ 2D nanosheets.

16. The method according to claim 15, wherein freeze drying the separated and washed 2D nanosheets comprises freeze drying the separated and washed 2D nanosheets into a 2D nanosheet powder comprising the 2D nanosheets, wherein collecting the 2D nanosheets after freeze drying comprises collecting the 2D nanosheet powder after freeze drying, wherein the solvent is benzyl alcohol, wherein the sonication process is a mild bath sonication process comprising sonicating in a mixture of DI water/NMP, wherein washing the exfoliated 2D nanosheets comprises washing the exfoliated 2D nanosheets a plurality of times with diluted HCl and DI water, and wherein the collected 2D nanosheets have a thickness of less than 5 nm each.

17. The method according to claim 15, wherein the bulk precursor is a $Sb_2S_3$ bulk precursor and the collected 2D nanosheets are $Sb_2S_3$ 2D nanosheets, wherein freeze drying the separated and washed 2D nanosheets comprises freeze drying the separated and washed 2D nanosheets into a 2D nanosheet powder comprising the 2D nanosheets, wherein collecting the 2D nanosheets after freeze drying comprises collecting the 2D nanosheet powder after freeze drying, wherein the solvent is benzyl alcohol, wherein the sonication process is a mild bath sonication process comprising sonicating in a mixture of DI water/NMP, wherein washing the exfoliated 2D nanosheets comprises washing the exfoliated 2D nanosheets a plurality of times with diluted HCl and DI water, and wherein the collected 2D nanosheets have a thickness of less than 5 nm each.

18. The method according to claim 15, further comprising:

mixing the collected 2D nanosheets with a conductive agent and a binder in a solvent to form a slurry, prior to depositing the collected 2D nanosheets on the conductive substrate; and depositing the slurry comprising the collected 2D nanosheets on the conductive substrate and heating to form the anode, wherein the conductive agent comprises at least one of graphene, carbon nanofibers (CNFs), and carbon nanotubes (CNTs).

19. A method for synthesizing a battery comprising an anode comprising two-dimensional (2D) nanosheets, the method comprising:

providing a bulk precursor;

performing solvothermal intercalation of lithium (Li) atoms into van der Waals bonded interlayers of particles of the bulk precursor in the presence of a solvent to form Li-intercalated bulk compounds;

performing a sonication process on the Li-intercalated bulk compounds to exfoliate the Li-intercalated bulk compounds into 2D nanosheets;

performing a centrifugation process to separate the exfoliated 2D nanosheets and then washing the exfoliated 2D nanosheets;

freeze drying the separated and washed 2D nanosheets;

collecting the 2D nanosheets after freeze drying;

depositing the collected 2D nanosheets on a conductive substrate and heating to form the anode; and combining the anode with a cathode to form the battery, wherein: a) the bulk precursor is a $Sb_2S_3$ bulk precursor and the collected 2D nanosheets are $Sb_2S_3$ 2D nanosheets; b) the bulk precursor is a $Sb_2Se_3$ bulk precursor and the collected 2D nanosheets are $Sb_2Se_3$ 2D nanosheets; c) the bulk precursor is a $Bi_2S_3$ bulk precursor and the collected 2D nanosheets are $Bi_2S_3$ 2D nanosheets; or d) the bulk precursor is a $Sb_2Te_3$ bulk precursor and the collected 2D nanosheets are $Sb_2Te_3$ 2D nanosheets, and wherein the battery is a lithium ion battery (LIB) or a sodium ion battery (SIB).

20. The method according to claim 19, further comprising:

mixing the collected 2D nanosheets with a conductive agent and a binder in a solvent to form a slurry, prior to depositing the collected 2D nanosheets on the conductive substrate; and depositing the slurry comprising the collected 2D nanosheets on the conductive substrate and heating to form the anode, wherein the conductive agent comprises at least one of graphene, CNFs, and CNTs.

* * * * *